United States Patent
Joshi et al.

(10) Patent No.: US 6,668,090 B1
(45) Date of Patent: Dec. 23, 2003

(54) PRODUCING A COMPRESSED DIGITAL IMAGE ORGANIZED INTO LAYERS CORRESPONDING TO INCREASING VISUAL QUALITY LEVELS AND PROVIDING RATE-CONTROL OF SUCH COMPRESSED DIGITAL IMAGE

(75) Inventors: Rajan L. Joshi, Rochester, NY (US); Paul W. Jones, Churchville, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/579,689

(22) Filed: May 26, 2000

(51) Int. Cl.[7] .............................. G06K 9/46; G06K 9/54

(52) U.S. Cl. ...................... 382/239; 382/248; 382/302

(58) Field of Search ................................ 382/240, 239, 382/232, 248, 253, 280, 302; 348/437.1, 438.1; 375/240.18, 240.19, 240.11

(56) References Cited

U.S. PATENT DOCUMENTS 6,327,392 B1 * 12/2001 Li .............................. 382/248

OTHER PUBLICATIONS

ISO/IEC JTC1/SC29 WG1 N1646, JPEG2000 Part I Final Committee Draft, Version 1.0, Mar. 2000.
"High Performance Scalable Image Compression with EBCOT" by David Taubman, IEEE Transactions on Image Processing, vol. 9, No. 7, Jul. 2000, pp. 1158–1170.
"Wavelet Transforms That Map Integers" by A. R. Calderbank et al., Applied and Computational Harmonic Analysis, vol. 5, No. 3, 1998, pp. 332–369.
"Comparative Study of Wavelet and DCT Decompositions with Equivalent Quantization and Encoding Strategies for Medical Images" by Paul W. Jones et al., Proc. SPIE Medical Imaging '95, vol. 2431, pp. 571–582.

* cited by examiner

Primary Examiner—Leo Boudreau
Assistant Examiner—Duy M. Dang
(74) Attorney, Agent, or Firm—Pamela R. Crocker

(57) ABSTRACT

A method for producing a compressed digital image from an input digital image is disclosed, wherein the compressed digital image is organized into layers corresponding to increasing visual quality levels. The input digital image is decomposed to produce a plurality of subbands, each subband having a plurality of subband coefficients. The plurality of subband coefficients of each subband of the decomposed input digital image are quantized to produce a quantized output value for each subband coefficient of each subband. At least one bit-plane is formed from the quantized output values of the subband coefficients of each subband. Each bit-plane of each subband in at least one pass is entropy encoded to produce a compressed bit-stream corresponding to each pass, wherein each subband is entropy encoded independently of the other subbands. A visual significance value is computed for each pass, and a visual quality table is provided that specifies a number of expected visual quality levels and corresponding visual significance values. For each expected visual quality level, a minimal set of passes and their compressed bit-streams that are necessary to achieve the corresponding visual significance value are identified. The compressed bit-streams corresponding to passes are then ordered into layers from the lowest expected visual quality level to the highest expected visual quality level specified in the visual quality table to produce a compressed digital image, wherein each layer includes the passes and their corresponding compressed bit-streams from the identified minimal set corresponding to the expected visual quality level that have not been included in any lower visual quality layers.

18 Claims, 9 Drawing Sheets

PRODUCING A COMPRESSED DIGITAL IMAGE ORGANIZED INTO LAYERS CORRESPONDING TO INCREASING VISUAL QUALITY LEVELS AND PROVIDING RATE-CONTROL OF SUCH COMPRESSED DIGITAL IMAGE

CROSS REFERENCE TO RELATED APPLICATIONS

Reference is made to commonly-assigned U.S. patent application Ser. No. 09/512,731, filed Feb. 24, 2000, entitled "Visually Progressive Ordering Of Compressed Subband Bit-Planes And Rate-Control Based On This Ordering" to Joshi et al.; commonly-assigned U.S. patent application Ser. No. 60/207,690, filed May 26, 2000, entitled "Digital Camera With Selectable Image Quality Reduction After Capture To Provide Enhanced Storage Capability" to Rabbani et al.; and commonly-assigned U.S. patent application Ser. No. 09/579,996 filed May 26, 2000, entitled "Producing A Compressed Digital Image Organized Into Layers Having Information Relating To Different Viewing Conditions And Resolutions" to Joshi et al., the disclosures of which are herein incorporated by reference.

FIELD OF INVENTION

This invention describes a method for producing a compressed digital image that is organized into layers corresponding to increasing visual quality level, and for providing rate-control of such compressed digital image.

BACKGROUND OF THE INVENTION

In recent years, many methods for subband or wavelet coding of images have been proposed. Some of these methods use entropy coding of the subband coefficient bit-planes, where the subband coefficients may have been quantized. Importantly, bit-plane encoding of wavelet coefficients is being used in the proposed JPEG2000 image compression standard, as described in ISO/IEC JTC1/SC29 WG1 N1646, JPEG2000 Part I Final Committee Draft, Version 1.0, March 2000.

The block diagram of a generic JPEG2000 encoder is shown in FIG. 1. The JPEG2000 encoder decomposes the image into a hierarchy of resolutions and the compressed data corresponding to a resolution is further divided into a number of quality layers, say 1,2, . . . , L. At any resolution, adding more layers to the compressed bit-stream generally improves the quality of the image reconstructed at that resolution and at higher resolutions. The JPEG2000 standard offers great flexibility in terms of organization and ordering of the compressed bit-stream. One such ordering enabled by JPEG2000 standard is known as "layer-resolution-component-position progressive", henceforward referred to as "layer-progressive". In this ordering, the compressed bit-stream is arranged in the increasing order of layer-index. That is, the data corresponding to layer 1 from all resolution levels appears at the start of the compressed bit-stream. This is followed by all the data belonging to layer 2, and so on. One useful property of such an ordering is that, if whole or partial layers appearing at the end of the compressed bit-stream are discarded, the truncated bit-stream can be decoded to produce a reconstructed image of lower quality.

As noted previously, layer-progressive ordering will generally provide improved quality with additional layers. However, there is no guarantee that the perceived image quality will be improved with each additional layer. This is because quality is often quantified in terms of mean squared error or similar metrics, and it is well known that these metrics do not correlate well with perceived image quality.

The JPEG2000 standard places very few restrictions on the formation of layers. Thus, it is up to the individual JPEG2000 encoder to devise application-specific methods for the formation of layers. In the prior art, a layer-progressive ordering is determined based on the relative visual weighting of the subbands (J. Li, "Visual Progressive Coding", SPIE Visual Communication and Image Processing, Vol. 3653, No. 116, San Jose, Calif., January 1999). In this method, it is possible to use different sets of visual weights at different ranges of bit-rates. The chief drawback of the method is that it is difficult to determine the bit-rate at which visual weights should be changed. This is because the compression ratios can vary widely depending on the image content, for the same compression settings.

Taubman (David Taubman, "High Performance Scalable Image Compression with EBCOT", to appear in IEEE Transactions on Image Processing) describes a method for the formation of layers in a JPEG2000 encoder. In his method, mean squared error (MSE) or visually weighted MSE is used as the distortion metric. Then, rate-distortion trade-off is used to decide how the layers are formed. As mentioned previously, MSE often does not correlate well with perceived visual quality. Also, it may sometimes be necessary to adjust the visual weightings based on the compression settings.

SUMMARY OF THE INVENTION

Accordingly, it is an object of the present invention to provide a method for the formation of the layers of a compressed bit-stream in a JPEG2000 encoder in such a manner that the layers correspond to increasing visual quality level. This object is achieved by a method for producing a compressed digital image from an input digital image, wherein the compressed digital image is organized into layers corresponding to increasing visual quality levels, comprising the steps of:

(a) decomposing the input digital image to produce a plurality of subbands, each subband having a plurality of subband coefficients;

(b) quantizing the plurality of subband coefficients of each subband of the decomposed input digital image to produce a quantized output value for each subband coefficient of each subband;

(c) forming at least one bit-plane from the quantized output values of the subband coefficients of each subband;

(d) entropy encoding each bit-plane of each subband in at least one pass to produce a compressed bit-stream corresponding to each pass, wherein each subband is entropy encoded independently of the other subbands;

(e) computing a visual significance value for each pass;

(f) providing a visual quality table that specifies a number of expected visual quality levels and corresponding visual significance values;

(g) for each expected visual quality level, identifying a minimal set of passes and their compressed bit-streams that are necessary to achieve the corresponding visual significance value; and (h) ordering the compressed bit-streams corresponding to passes into layers from the lowest expected visual quality level to the highest expected visual quality level specified in the visual quality table to produce a compressed digital image, wherein each layer includes the passes and their corresponding compressed bit-streams from the identified minimal set corresponding to the expected visual quality level that have not been included in any lower visual quality layers.

It is a further object to provide an efficient method for rate-control of one or more compressed digital images having layers which correspond to increasing visual quality level. This object is achieved by a method of rate-control for at least one image, comprising the steps of:

(a) providing a visual quality table for each image that specifies a number of expected visual quality levels and corresponding visual significance values;

(b) compressing the plurality of images to produce compressed digital images, wherein each compressed digital image includes layers corresponding to the expected visual quality levels specified in the visual quality table;

(c) producing a table of visual significance values and corresponding file sizes for possible truncation points of each compressed digital image, wherein for the expected visual quality levels of each compressed digital image, the truncation points represent the number of bytes necessary to achieve the corresponding expected visual quality levels;

(d) initializing a current truncation point for each image;

(e) truncating each compressed digital image to the corresponding current truncation point;

(f) calculating a total compressed file size for the truncated compressed digital images;

(g) comparing the total compressed file size for the truncated compressed digital images with a predetermined bit-budget;

(h) updating the current truncation point to the next possible truncation point for the image having the lowest visual significance value at the next possible truncation point; and (i) repeating steps (e) through (h) until the total compressed file size is equal to or less than the bit-budget.

ADVANTAGES OF THE INVENTION

The present invention provides a method for the formation of layers in such a manner that the compressed data in a lower-indexed layer at any resolution has higher visual significance and appears earlier in the compressed bit-stream compared to a higher-indexed layer at any resolution. This is also known as a "visually progressive" compressed bit-stream. The advantage of this ordering is that if the compressed bit-stream is truncated, visually less significant layers will be discarded first. In addition, when the compressed bit-stream is arranged in a layer-progressive manner, and the bit-stream is truncated to retain only the first j layers, the $j^{th}$ visual quality level is attained.

The rate-control method of the present invention provides an advantage in that it discards layers from compressed bit-streams of individual images so that the total file size of the truncated bit-streams does not exceed a user-specified bit-budget, and the overall visual quality of the image set is maximized.

BRIEF DESCRIPTION OF THE DRAWINGS

In describing a preferred embodiments of the invention reference will be made to the series of figures and drawings briefly described below.

There may be additional structures described in the foregoing application that are not depicted on one of the described drawings. In the event such a structure is described, but not depicted in a drawing, the absence of such a drawing should not be considered as an omission of such design from the specification.

DETAILED DESCRIPTION OF THE INVENTION

The present invention relates to compression of a digital image. Although there are other techniques well known in the art, the present invention will be described with respect to the techniques set forth in the JPEG2000 image compression standard. Because the proposed JPEG2000 image compression standard specifies how the decoder shall interpret a compressed bit-stream, there are certain inherent restrictions on any JPEG2000 encoder. For example, in Part I of the standard, only certain wavelet filters can be used. The entropy coder is also fixed. These methods are described in ISO/IEC JTC1/SC29 WG1 N1646, JPEG2000 Part I Final Committee Draft, Version 1.0, March 2000. Hence, the present description will be directed in particular to attributes forming part of, or cooperating more directly with, the algorithm in accordance with the present invention. Attributes not specifically shown or described herein may be selected from those described in ISO/IEC JTC1/SC29 WG1 N1646, JPEG2000 Part I Final Committee Draft, Version 1.0, March 2000, or otherwise known in the art. In the following description, a preferred embodiment of the present invention would ordinarily be implemented as a software program, although those skilled in the art will readily recognize that the equivalent of such software may also be constructed in hardware. Given the system and methodology as described in the following materials, all such software implementation needed for practice of the invention is conventional and within the ordinary skill in such arts. If the invention is implemented as a computer program, the program may be stored in conventional computer readable storage medium, which may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Reference will now be made in detail to the present preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives; modifications, and equivalents as may be included within the spirit and scope of the invention defined in the appended claims.

Figure 1:
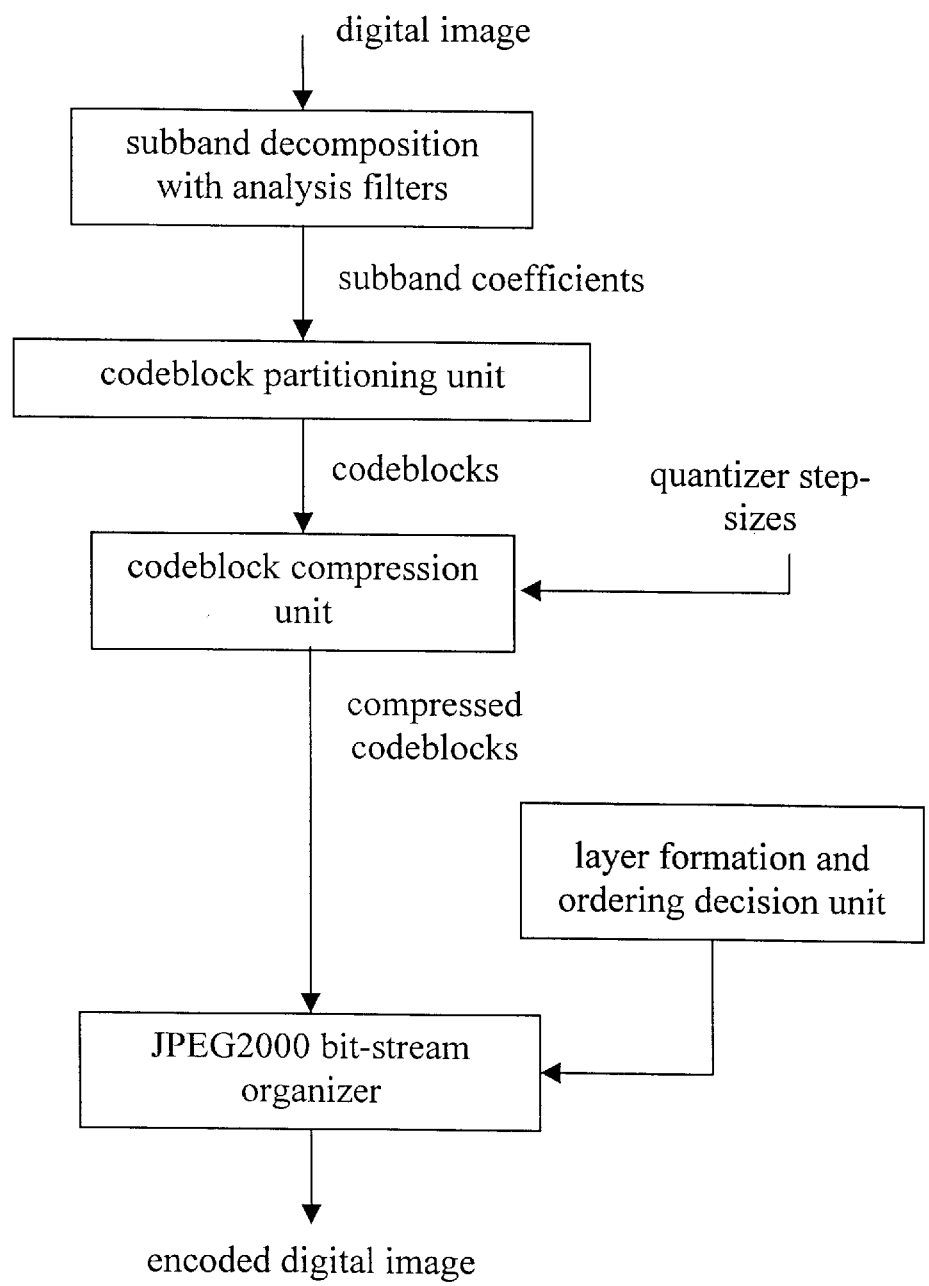
FIG. 1 shows a block diagram of a generic JPEG2000 image encoder.
Figure 2:
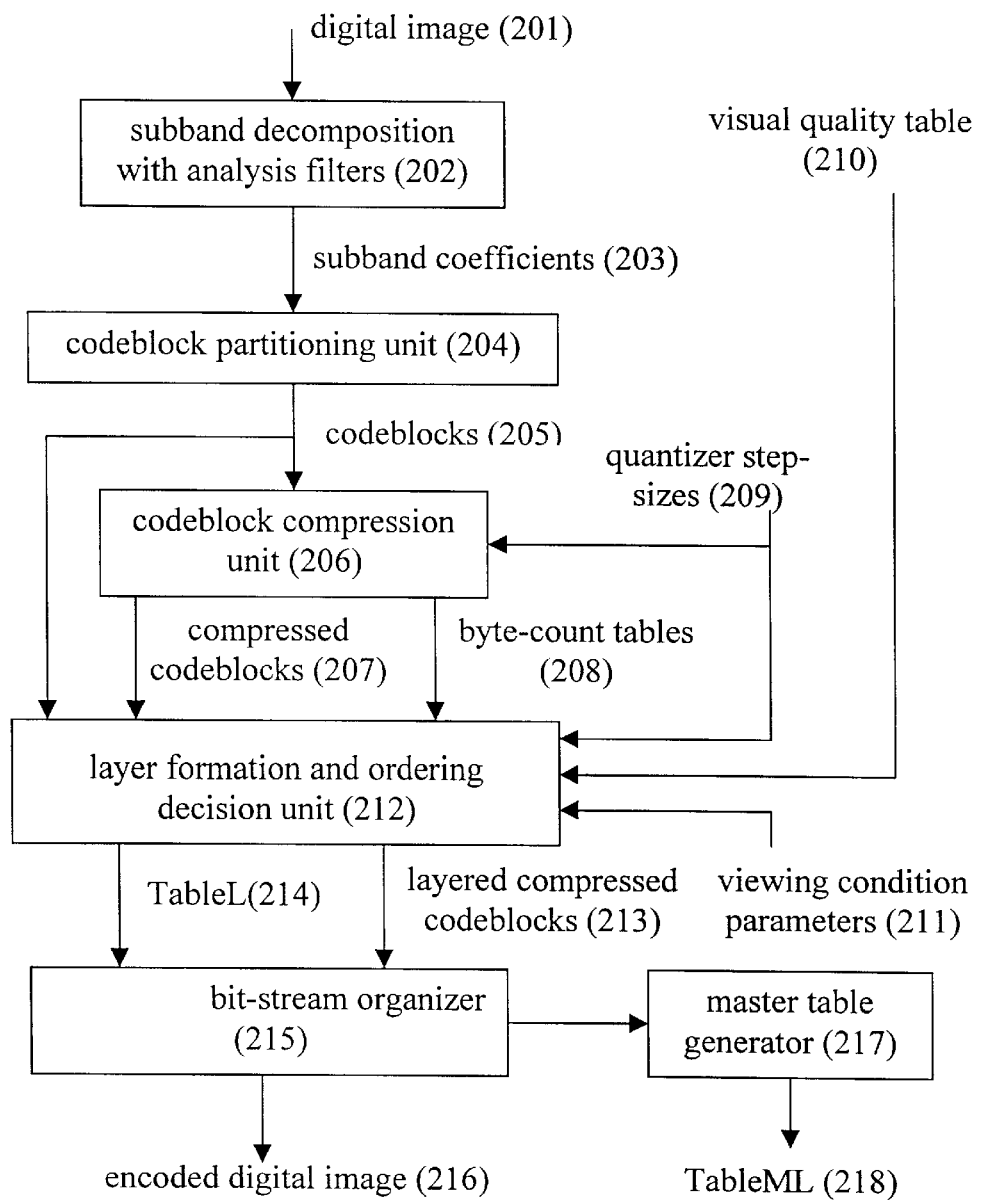
FIG. 2 shows a flow chart of an image encoder according to the present invention.

A flow chart of a JPEG2000 image encoder according to the present invention is shown in FIG. 2. A digital image (201) undergoes subband decomposition (202) by the analysis filters to produce an image representation in terms of subband coefficients (203). If the image has multiple components (e.g., RGB), a luminance-chrominance transformation can be applied to convert it to a YCbCr representation, before the subband decomposition step (202). Also, it is possible to divide each component of the image into a number of tiles. But in this preferred embodiment, only a single tile consisting of the entire image is used. The subband coefficients (203) are partitioned into rectangular blocks by the codeblock partitioning unit (204) to produce one or more codeblocks (205). Those skilled in the art would appreciate that partitioning of the subband coefficients is not necessary if only a single codeblock is used. Each codeblock is compressed by the codeblock compression unit (206) using the appropriate quantizer step-size (209) to produce a compressed codeblock (207) and a byte-count table (208). For each codeblock, the compressed bit-stream (207) and the byte-count table (208) are fed to a layer formation and ordering decision unit (212). The other inputs to the layer formation and decision unit (212) are the quantizer step-size (209) used to quantize that codeblock, a table of desired visual quality levels (210) and viewing condition parameters (211). For each codeblock, the layer formation and decision unit (212) determines how many coding passes should be included in each layer to produce layered compressed codeblock (213) and TableL (214) that stores information about the number of coding passes and the corresponding bytes in each layer. The layer formation and ordering decision unit (212) also specifies that the overall bit-stream is to be arranged in a layer-progressive manner. This ordering information, the layered compressed codeblocks (213), and TableL (214) are fed to the JPEG2000 bit-stream organizer (215) to produce an encoded digital image (216) that is JPEG2000 compliant. The master table generator (217) generates TableML (218) whose $j^{th}$ entry specifies the number of bytes required to represent the compressed data corresponding to the first j layers. This information is also contained in the compressed bit-stream, but in some applications it may be advantageous to store the information separately so that it is not necessary to parse the bit-stream for the information.

Figure 3:
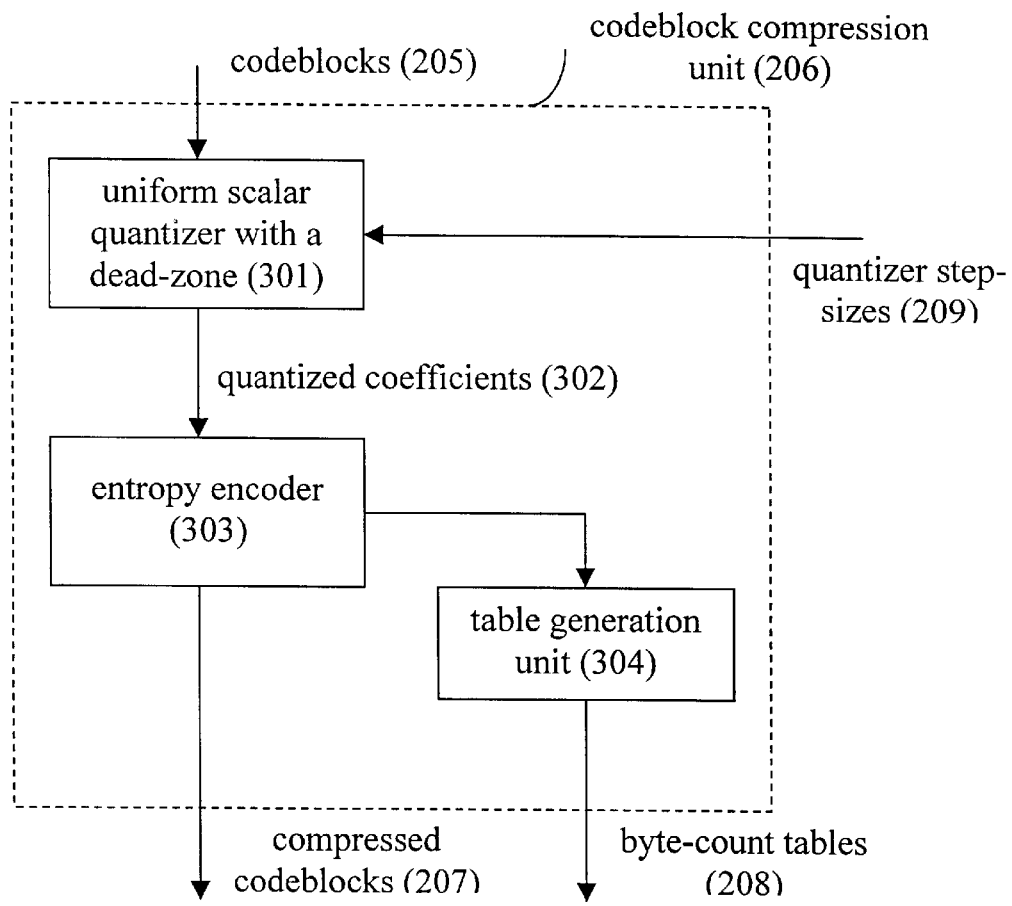
FIG. 3 shows a block diagram of the codeblock compression unit.
Figure 4A:
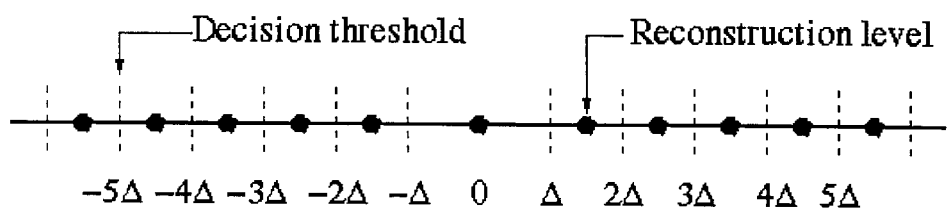
FIGS. 4A and 4B show graphs of the decision thresholds and reconstruction levels for step-sizes of $\Delta$ and $2\Delta$, respectively, for a uniform scalar quantizer with dead-zone.
Figure 4B:
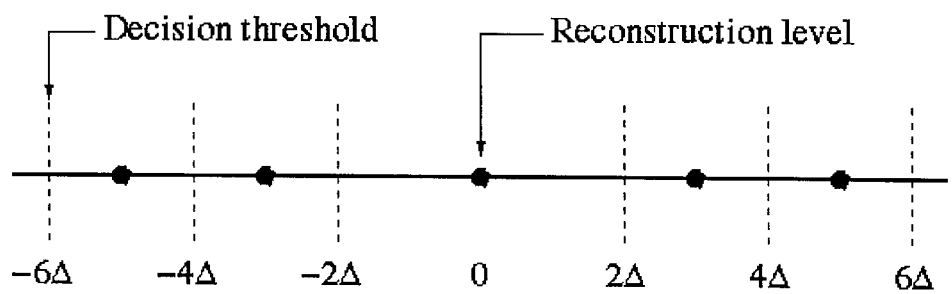

The blocks in FIG. 2 will now be described in greater detail. Let the total number of subbands in the decomposition be S, indexed as i=0,1, . . . (S−1). The codeblock partitioning unit (204) partitions each subband into a number of rectangular codeblocks. The codeblock compression unit (206) is shown in greater detail in FIG. 3. Each codeblock is quantized with a scalar quantizer (301) using the appropriate quantizer step-size (209) to produce a sign-magnitude representation of the indices of the quantized coefficients (302). Preferably, a uniform scalar quantizer with a dead-zone is used. The decision thresholds and reconstruction levels for this quantizer are shown in FIGS. 4A and 4B. FIG. 4A shows the decision thresholds and reconstruction levels for a step-size of Δ; FIG. 4B shows the decision thresholds and reconstruction levels for a step-size of 2Δ. In a preferred embodiment, the reconstruction levels are always at the center of the quantization interval. But those skilled in the art will recognize that this is not necessary. For example, the reconstruction levels can be biased towards zero. The same base quantizer step-size is used for all the codeblocks in a given subband. Let the step-size for subband i be $\Delta_i$. It should be noted that the maximum quantization error, denoted by $E_{max}$, is $(\Delta_i/2)$, except for the zero bin which has a maximum quantization error of $\Delta_i$. If the subband analysis and synthesis filters are reversible (R. Calderbank, I. Daubechies, W. Sweldens, and B.-L. Yeo, "Wavelet Transform that Maps Integers to Integers," *Applied and Computational Harmonic Analysis*, vol. 5, no. 3, pp. 332–369, 1998), the quantization step may be entirely absent.

Suppose that the block being processed is from subband i. Then, the samples from the block are quantized with a uniform scalar quantizer with step size $\Delta_i$ as described above. Suppose that the magnitude of the index of a quantized coefficient is represented by a fixed precision of $A_i$ bits. Let the bits be indexed as 1,2, . . . ,$A_i$, where index 1 corresponds to the most significant bit (MSB) and $A_i$ corresponds to the least significant bit (LSB). The $k^{th}$ bit-plane for the codeblock consists of the $k^{th}$ bit from the magnitude representation of all the quantized coefficients from that codeblock. One interesting property of the scalar quantizer being used is that discarding, or zeroing out, the k least significant bits from the magnitude representation of the index of a quantized coefficient from subband i is equivalent to scalar quantization of that coefficient with a step-size of $2^k\Delta_i$. Thus, if the compressed bit-stream corresponding to the codeblock is truncated so that the data corresponding to the last k bit-planes is discarded, it is possible to reconstruct a more coarsely quantized version of the codeblock. This is known as the embedding property. It should be noted that if the last k bit-planes of the magnitude representation of the index of a quantized coefficient are dropped, for reconstruction at the decoder, the reconstruction levels for the quantizer with a step-size of $2^k\Delta_i$ are used.

For the purpose of entropy coding, a bit-plane for a codeblock is said to be significant if any of the previous bit-planes were significant or the current bit-plane has at least one non-zero bit. The entropy encoder (303) codes each bit-plane for the codeblock in one or more coding passes. For example, the most significant bit-plane is encoded using a single coding pass. The rest of the bit-planes for the codeblock are encoded using three coding passes. In JPEG2000, the MQ arithmetic coder is used as the entropy coder. The table generation unit (304) generates a byte-count table (208) for each codeblock. The $m^{th}$ entry in the table corresponds to the number of bytes needed to include coding passes 1,2, . . . ,m of the codeblock in the bit-stream.

The layer formation and ordering decision unit (212) determines the number of coding passes to be included in each layer so that the visual quality criteria as specified by the visual quality table (210) are met. The $J^{th}$ entry of the visual quality table (210) specifies the minimum expected visual quality of the reconstructed image if only the first j layers are included in the compressed bit-stream. Each coding pass of a codeblock is assigned a visual significance. A higher visual significance means that if the coding pass is not included in the compressed bit-stream, the visual quality of the reconstructed image will decrease more.

In a preferred embodiment, the visual significance of a coding pass is determined in terms of a threshold viewing distance corresponding to the coding pass. This is accomplished by using the two-dimensional Contrast Sensitivity Function (CSF) of the human visual system (HVS). The CSF model described in Jones et al., "Comparative study of wavelet and DCT decomposition with equivalent quantization and encoding strategies for medical images", *Proc. SPIE Medical Imaging'95*, vol. 2431, pp. 571–582, which is incorporated herein by reference, models the sensitivity of the human visual system as a function of the two-dimensional (2-D) spatial frequency, and it depends on a number of parameters, such as viewing distance, light level, color, image size, eccentricity, noise level of the display, etc. The frequency dependence of the CSF is commonly represented using cycles/degree of visual subtense. The CSF can be mapped to other units, such as cycles/mm, for a given viewing distance (i.e., the distance from the observer to the displayed image).

The 2-D CSF value for subband i is $CSF(F_i, V, N, D)$, where V is the viewing distance, N is the noise level of the display, D is the dots per inch (dpi) of the display, and $F_i$ represents the 2-D spatial frequency (in cycles/mm) associated with subband i. In a preferred embodiment, $F_i$ is chosen to be the center of the frequency range nominally associated with subband i. As described in the Jones et al. paper, if subband i is quantized with a uniform scalar quantizer having a dead-zone, the step-size $Q_i(V)$ that results in just noticeable distortion in the reconstructed image at a viewing distance of V is $$Q_i(V) = \frac{1}{C \times MTF(F_i) \times G_i \times CSF(F_i, V, N, D)},$$

where $MTF(F_i)$ is the display MTF at frequency $F_i$, C is the contrast per code-value of the display device, and $G_i$ is the gain factor that represents the change in contrast for the reconstructed image for one code-value change in a coefficient of subband i. The gain factor depends on the level and orientation of the subband, as well as the subband synthesis filters. Compared to the paper by Jones et al, a factor of 0.5 is missing from the denominator. This is due to the fact that for uniform scalar quantizer with a dead-zone, the maximum possible distortion, $E_{max}$, is equal to the step-size, as opposed to half the step-size for a uniform scalar quantizer in the absence of a dead-zone.

The threshold viewing distance for a quantized image is defined as the viewing distance at which any distortion in the reconstructed image is just noticeable. Thus, the visual quality of a quantized image can be quantified in terms of a threshold viewing distance, e.g., a higher threshold viewing distance corresponds to lower visual quality. Now, one model for the HVS is that it processes each band of subband decomposition independently. Thus, the contribution of a quantized codeblock to the overall distortion in the reconstructed image can be assumed to be independent of the quantization occurring in any other codeblock. For a specific codeblock that has been quantized with a step-size $Q_i$, we can also associate a corresponding threshold viewing distance $V_i$. This relationship can be written as:

$$Q_i = K(V_i),$$

where K is a function characterizing the dependence of $Q_i$ on the viewing distance $V_i$. The inverse of the function K is needed to determine the threshold viewing distance for a particular step-size, i.e, $$V_i = K^{-1}(Q_i).$$

Alternatively, suppose that the maximum absolute quantization error for the codeblock is $E_{max}$. Then, the codeblock can be thought of as being quantized by a uniform dead-zone scalar quantizer with a step-size $Q_i = E_{max}$. In that case, $$V_i = K^{-1}(E_{max}).$$

Figure 5:
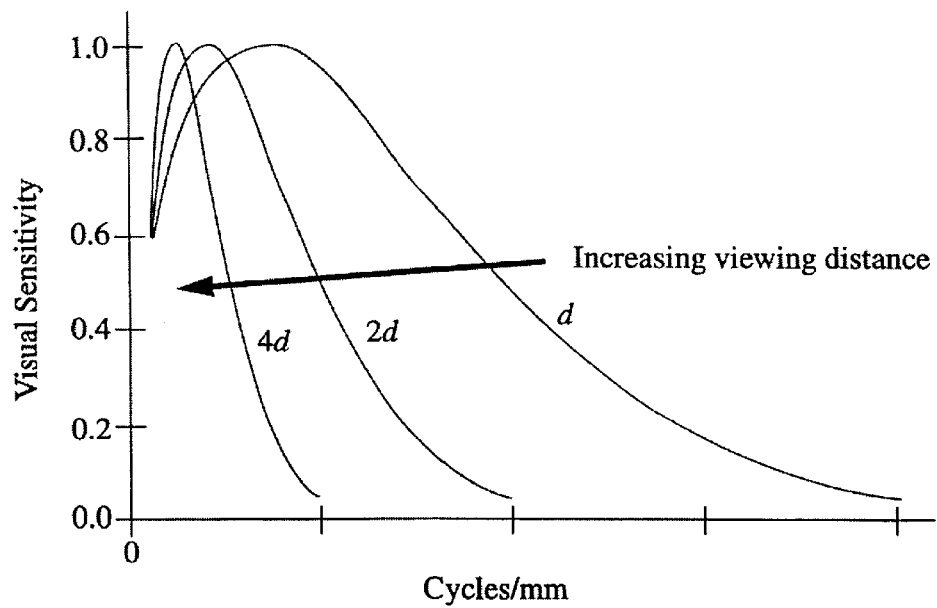
FIG. 5 shows typical one-dimensional Contrast Sensitivity Functions (CSF's) for viewing distances of d, $2d$, and $4d$.

Thus, a threshold viewing distance for each codeblock can be determined based upon the maximum absolute quantization error associated with the codeblock. To find this inverse function, it is first noted that the one-dimensional CSF at a given spatial frequency generally increases with decreasing viewing distance, as shown in FIG. 5 for viewing distances of d, 2d, and 4d. However, at very low frequencies, it starts decreasing again, and thus, a unique inverse, $K^{-1}$, does not exist. The CSF can be modified slightly to ensure the existence of $K^{-1}$. For calculating the CSF for a viewing distance V, an envelope is taken of all CSF curves with a viewing distance greater than or equal to V. This ensures that K is a non-decreasing function. $K^{-1}$ is defined in such a manner that ties are resolved in favor of the smallest viewing distance. This implies that the threshold viewing distance for a subband is strictly increasing function of the quantizer step-size. In a preferred embodiment, $K^{-1}$ is implemented as a look-up table.

Figure 6:
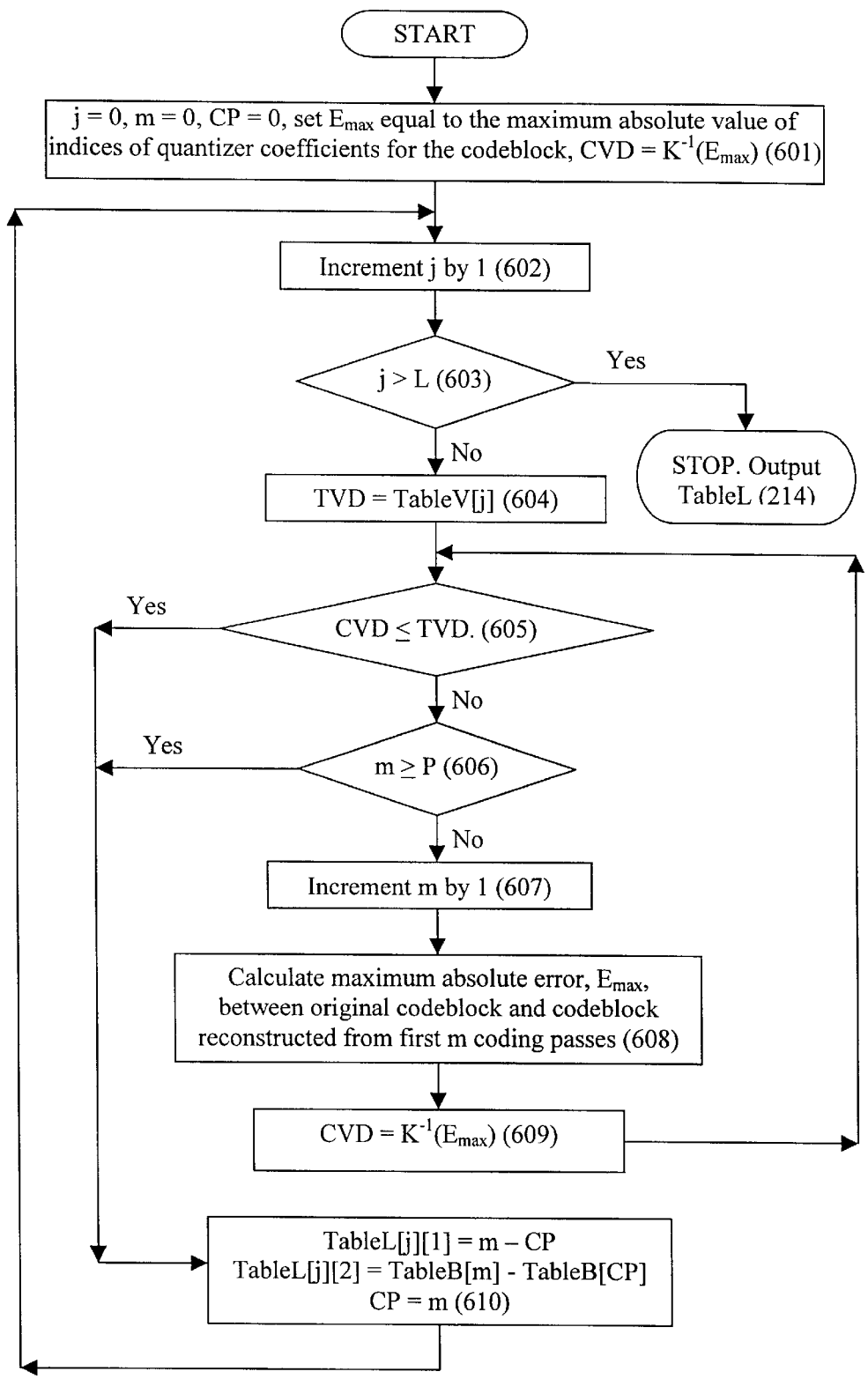
FIG. 6 shows a flow chart of the "layer formation and ordering decision unit" of FIG. 2.

The function $K^{-1}$ is used by the layer formation and ordering decision unit (212) to determine the threshold viewing distance for a codeblock if only a subset of the layers is retained. A more detailed flow chart for the layer formation and ordering decision unit (212) is shown in FIG. 6. Assume that the total number of layers is L and the total number of coding passes for the codeblock is P. The inputs to the layer formation and ordering decision unit (212) are: 1) the visual quality table (210) having L entries, referred to as TableV, 2) the original codeblock (205), 3) the compressed bit-stream corresponding to the codeblock (207), 4) the byte-count table for the codeblock (208), referred to as TableB, and 5) the viewing condition parameters (211). The visual quality table (210) stores the expected visual quality levels, with the $j^{th}$ entry representing the expected visual quality if only the first j layers are included in the compressed bit-stream. The visual quality levels are pre-specified in terms of threshold viewing distances, and are stored in decreasing order. The $m^{th}$ entry of the byte-count table (208) represents the number of bytes necessary to represent the compressed data corresponding to the first m coding passes for the codeblock. The layer formation and ordering decision unit (212) generates TableL (214) that has L rows and 2 columns. The $1^{st}$ entry from row j denotes the number of coding passes that are to be included in layer j, and the $2^{nd}$ entry of row j indicates the number of bytes needed to add layer j to the existing compressed bit-stream for that codeblock.

The initializer unit (601) initializes j, m, and the number of cumulative passes, CP, to zero. It also initializes $E_{max}$ to the maximum absolute value of the indices of quantized coefficients for the codeblock and sets the current threshold viewing distance, CVD, to $K^{-1}(E_{max})$. In step (602), j is incremented by 1. Then, the comparison unit (603) compares j against the number of layers, L. If j is greater than L, all the layers have been formed and the process is stopped and TableL (214) is written out, otherwise the process is continued. In step (604), the target viewing distance, TVD, is set to the $j^{th}$ entry from TableV. A second comparison unit (605) compares the current viewing distance against the target viewing distance. If the current viewing distance is less than or equal to the target viewing distance, the flow-control skips to step (610). Otherwise, m is compared against the total number of passes, P (606). If m is greater than or equal to P, the flow-control skips to step (610). Otherwise, m is incremented by 1 (607). Then, the codeblock is reconstructed by using compressed data corresponding to the first m coding passes, and the maximum absolute difference, $E_{max}$, between the original codeblock and the reconstructed codeblock is found (608). The current viewing distance is updated to $K^{-1}$ ($E_{max}$) (609), and the flow-control returns to step (605). In step (610), TableL[j][1] is set to (m−CP) and TableL[j][2] is set to (TableB[m]−TableB[CP]). Also, the number of cumulative passes is set to m. Then the flow-control returns to step (602). Thus, steps 605 through 609 have the effect of identifying a minimal set of passes and their corresponding compressed bit-streams that are necessary to satisfy each expected visual quality level provided in the visual quality table (210).

It should be noted that the step-size used to quantize the codeblock should be sufficiently small so that when all the coding passes for the codeblock are included in the bit-stream, the maximum visual quality level specified in the visual quality table (210) can be achieved or exceeded. In a preferred embodiment, this is achieved by determining the step-size for each subband from the threshold viewing distance corresponding to the maximum expected visual quality level such that the distortion in the reconstructed image is just noticeable, as discussed previously. This guarantees that the step-size used to quantize each subband is sufficiently fine.

Figure 7:
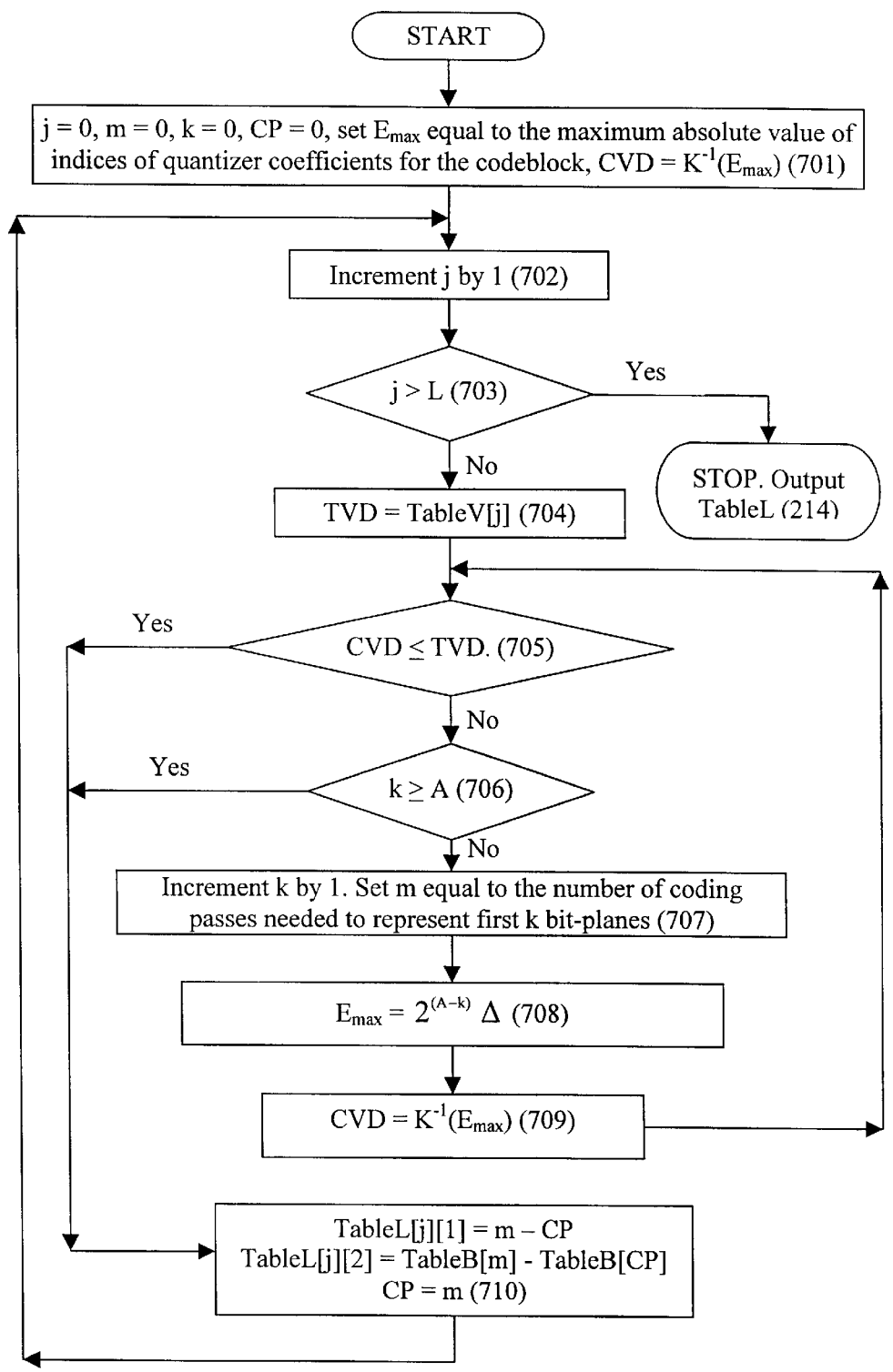
FIG. 7 shows a flow chart of another embodiment of the "layer formation and ordering decision unit" of FIG. 2.

Another embodiment of the layer formation and ordering decision unit (212) is shown in FIG. 7, where an additional constraint is placed on the formation of the layers. The constraint is that the layer boundaries for a block must coincide with bit-plane boundaries. As discussed previously, let the magnitudes of the indices of quantized codeblock coefficients, quantized with step-size $\Delta$, be represented by a fixed precision of A bits. Let the bits be indexed as 1, . . . ,A, with index 1 representing the MSB. Now suppose that the k least significant bit-planes of the codeblock are discarded. Then, the effective quantizer step-size for the codeblock is ($2^k \Delta$), and the corresponding threshold viewing distance is $K^{-1}$ ($2^k \Delta$). Instead of calculating the maximum absolute error, $E_{max}$, between the original codeblock and the reconstructed codeblock as done previously, we set $E_{max}$ equal to $2^k \Delta$.

In the alternative embodiment, the initializer unit (701) also initializes k to 0. Steps 702 through 705 are identical to steps 602 through 605. In step 706, k is compared with A, the total number of bit-planes for the codeblock. If k is greater than or equal to A, the flow-control passes to step 710. Otherwise, in step 707, k is incremented by 1, and m is updated so that m represents the number of coding passes needed to represent the first k bit-planes. In step 708, the effective step-size corresponding to retaining only the first k bit-planes, ($2^{(A-k)} \Delta$), is calculated, and $E_{max}$ is set to this value. Steps 709 through 710 are identical to steps 609 through 610. Thus, steps 705 through 709 have the effect of identifying a minimal set of passes and their corresponding compressed bit-streams that are necessary to satisfy each expected visual quality level provided in the visual quality table (210).

In another embodiment, the visual quality of the image is quantified in terms of the threshold display noise level. The threshold display noise level is defined as the noise level of the display for which the distortion in the reconstructed image is just noticeable, when other factors affecting the CSF such as the viewing distance and the dpi of the display are held constant. Similar to the case of threshold viewing distance, for a specific codeblock that has been quantized with a step-size $Q_i$, a corresponding threshold display noise level, $N_i$ can be associated. This relationship can be written as:

where M is a function characterizing the dependence of $Q_i$ on the display noise level $N_i$. In this case, a higher display noise level will generally correspond to a higher step-size. The inverse function, $M^{-1}$, can be defined in a manner similar to the definition of $K^{-1}$. Then, the visual quality table (210) is specified in terms of threshold display noise levels, with higher noise levels corresponding to lower visual quality. The layer formation and ordering decision unit (212) is also modified suitably by replacing current viewing distance (CVD) and target viewing distance (TVD) with current noise level (CNL) and target noise level (TNL), respectively.

In some applications, it may desirable to compare the visual qualities of images which may be displayed (hardcopy or softcopy) at different dpi's and different intended viewing distances. In such cases, it is advantageous to ignore the change in the CSF due to accommodation effects at closer viewing distances, and combine the CSF parameters of viewing distance and dpi into a single parameter, the visual subtense angle of a pixel. In that case, the visual quality of an image can be specified in terms of a threshold angle of visual subtense. Then, a lower threshold angle of visual subtense corresponds to lower visual quality. The layer formation method can be modified appropriately as in the case of using threshold display noise level as a measure of visual quality. The only difference is that the comparison unit (605) checks whether the current angle of visual subtense is greater than or equal to the target angle of visual subtense.

Figure 8:
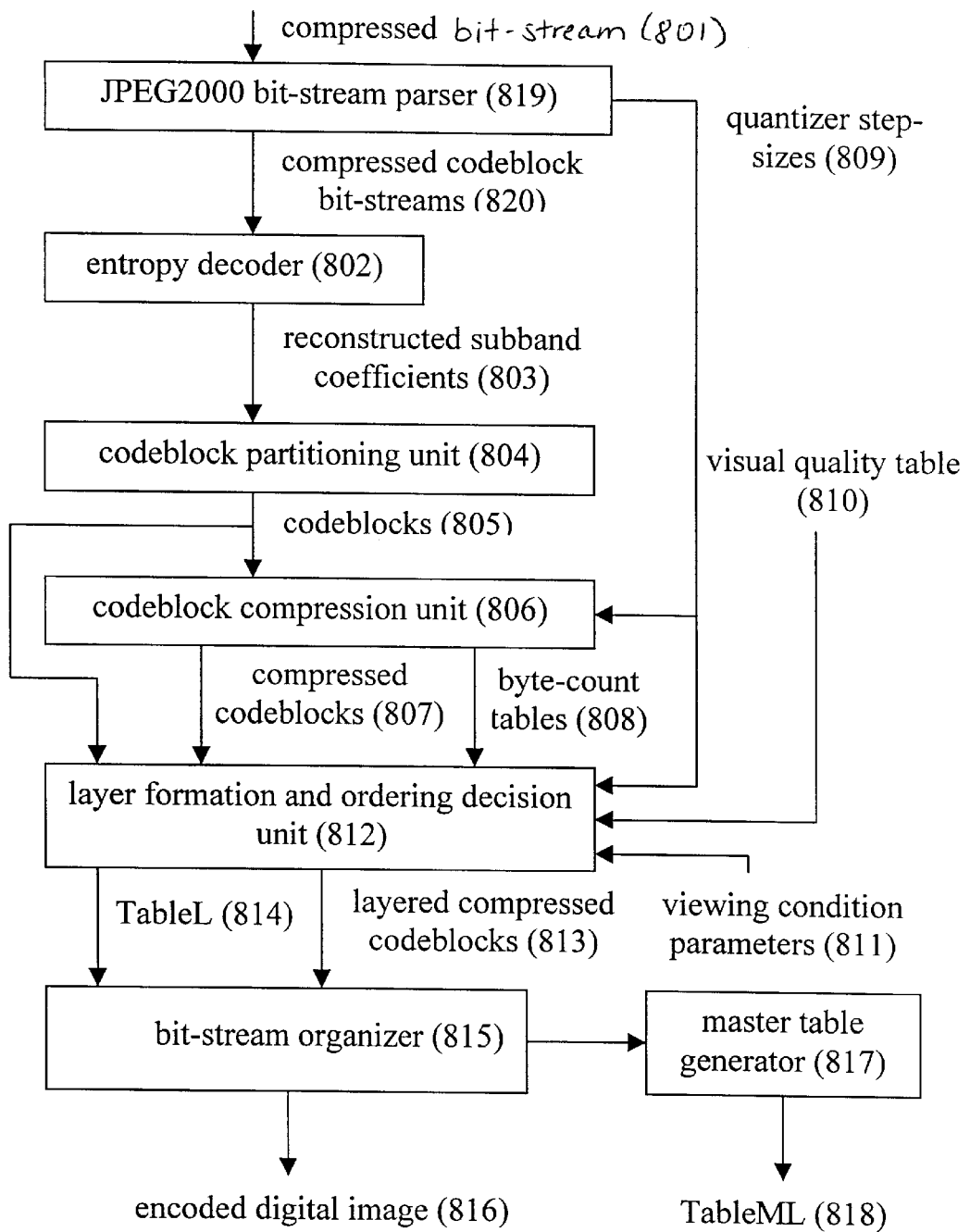
FIG. 8 shows a flow chart of the method for reconfiguring a JPEG2000 compressed bit-stream in a visually progressive arrangement of the layers in accordance with the present invention.

Another embodiment of the invention is shown in FIG. 8. A compressed bit-stream (801) produced by a JPEG2000 encoder is passed through a JPEG2000 bit-stream parser (819) to produce compressed bit-stream corresponding to each codeblock (820). The bit-stream parser also extracts information about quantizer step-sizes (809). Each compressed codeblock bit-stream is passed through an entropy decoder (802) to reconstruct quantized subband coefficients (803). Steps 804–818 are exactly identical to the corresponding steps 204–218. It should be noted that if the base quantizer step-sizes used to produce the original JPEG2000 bit-stream are coarse, it may not be possible to achieve all the visual quality levels from the visual quality table (810).

The visual progressive ordering method can be easily extended to provide a simple rate-control method when encoding one or more images. Suppose that Q images (Q≧1) have been compressed using the JPEG2000 encoder in the visually progressive manner previously described. It is assumed that display noise, dpi of the display, and viewing conditions are the same for each image. Let the total bit-budget be $R_T$ bytes. We describe a method to find a truncation point for the compressed bit-stream of each image so as to maximize the overall visual quality of the image set.

Previously, it was discussed how the quality of a compressed image may be quantified in terms of a threshold viewing distance. Similarly, one may quantify the overall quality of a set of compressed images by the threshold viewing distance, $V_{set}$, for the set of Q images. This is defined as the lowest viewing distance at which all reconstructed images in the set appear visually lossless, i.e., the distortion is just noticeable. If $V_q$ is the threshold viewing distance for image q, $1 \leq q \leq Q$, at a given bit-stream truncation point, then $$V_{set} = \max_q V_q.$$

The problem of rate-control is to truncate each compressed bit-stream such that $V_{set}$ is minimized, subject to the constraint that the overall file size of the truncated bit-streams is at most $R_T$ bytes.

As described previously, the JPEG2000 encoder produces TableML for each image. The $j^{th}$ entry of the table specifies the number of bytes required to retain first j layers of the image in the compressed bit-stream. To perform the rate-control method, for each image q, a two-column table $T_q$, is produced. The first column is a list of compressed file sizes at possible truncation points. We allow the compressed bit-stream to be truncated only at the layer boundaries. Thus, TableML produced by the JPEG2000 encoder for that image is copied to first column of the table $T_q$. The second column of the table is a list of corresponding threshold viewing distances, copied over from the visual quality table input to the JPEG2000 encoder for that image.

Figure 9:
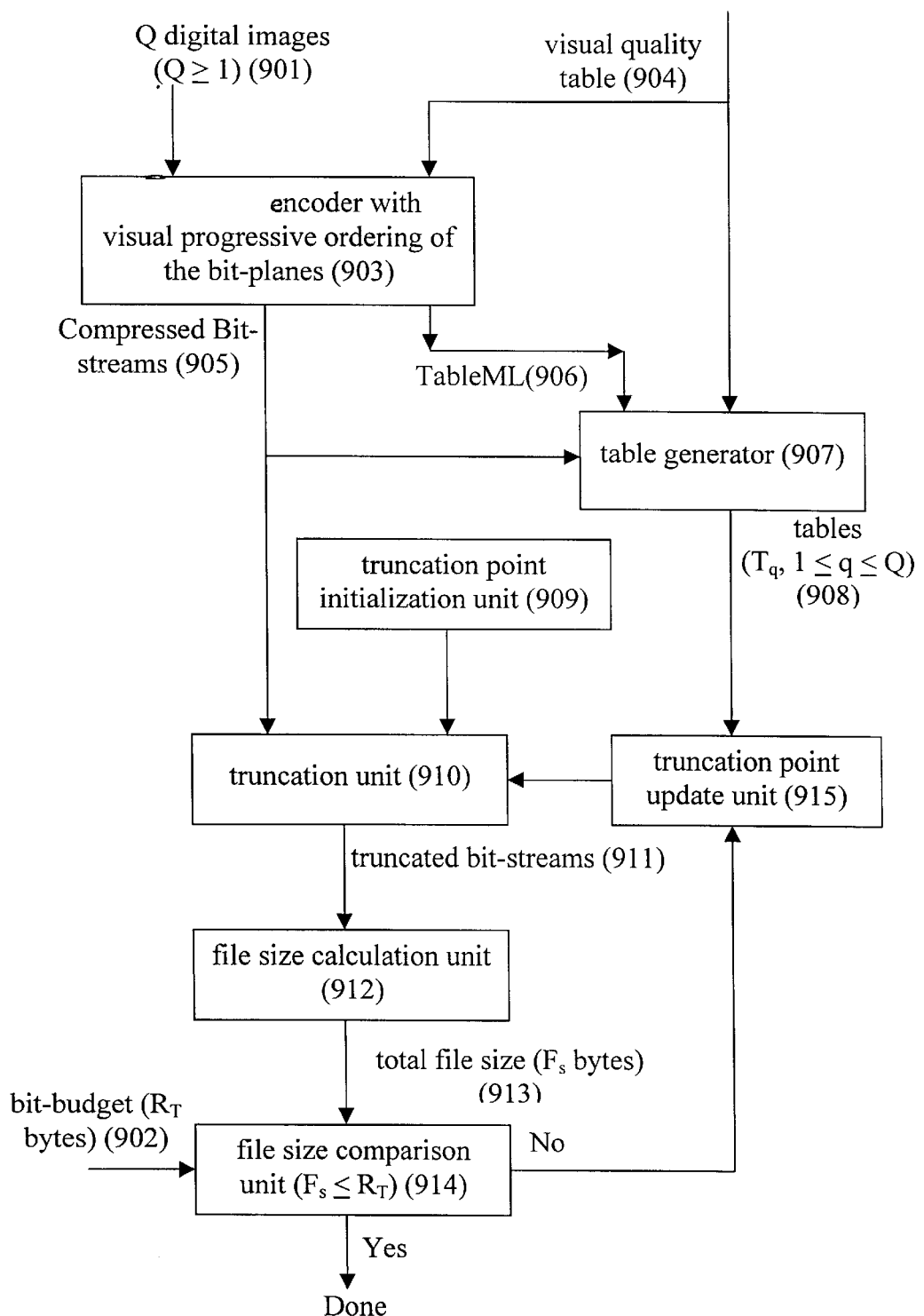
FIG. 9 shows a flow chart of the rate-control method in accordance with the present invention.

The flow chart of the rate-control method is shown in FIG. 9. Given a set of Q images, $Q \geq 1$, (901) and a bit-budget of $R_T$ bytes (902), the method proceeds as follows. The JPEG2000 encoder (903) encodes each image in the set in the visually progressive manner using a visual quality table (904), as described previously. It is possible to use a different visual quality table for each image. The JPEG2000 encoder (903) generates compressed bit-stream (905) as well as TableML (906) for each image. The table generating unit (907) generates tables $T_q$, $1 \leq q \leq Q$ (908). The truncation point initialization unit (909) initializes the truncation point for each image so that the entire image is retained. Those skilled in the art will recognize that it is also possible to initialize the truncation points in other ways. For example, the user may specify a desired maximum visual quality level in terms of a threshold viewing distance for each image. In this case, the truncation point for each image can be chosen to correspond to the maximum threshold viewing distance that is less than or equal to the user-specified threshold viewing distance for that image. The truncation unit (910) truncates the compressed bit-stream for each image to the corresponding current truncation point to produce truncated bit-streams (911). The file size calculation unit (912) calculates the total compressed file size $F_s$ (913) for the truncated compressed bit-streams. The file size comparison unit (914) compares the total compressed file size with the bit-budget of $R_T$ bytes (902). If the total compressed file size is less than or equal to $R_T$ bytes, the process is stopped. Otherwise, the truncation point update unit (915) sets the current truncation point to the next row, for the image having the lowest threshold viewing distance at the next possible truncation point. Ties are broken in favor of the image that results in the smallest overall file size after updating its truncation point. The process of truncation, total file size calculation, file size comparison, and update continues until the bit-budget is met.

Those skilled in the art will recognize that it is also possible to start with compressed bit-streams corresponding to the minimum file size, and then choose successive concatenation points to add more layers until the overall file size exceeds the bit-budget of $R_T$ bytes. Our method starts with compressed bit-streams corresponding to the maximum file size, and then discards layers. This has certain advantages in terms of computational complexity if the rate-control has to be performed multiple times for successively lower bit-budgets.

Those skilled in the art will recognize that it is possible to extend the method to the cases where the visual quality metric is threshold display noise level or threshold angle of visual subtense. If the display dpi can vary from image to image, the threshold angle of visual subtense is the preferred visual metric.

Further modification and variation can be made to the disclosed embodiments without departing from the subject and spirit of the invention as defined in the following claims. Such modifications and variations, as included within the scope of these claims, are meant to be considered part of the invention as described.

PARTS LIST 201 digital image
202 subband decomposition with analysis filters
203 subband coefficients
204 codeblock partitioning unit
205 codeblocks
206 codeblock compression unit
207 compressed codeblocks
208 byte-count tables
209 quantizer step-sizes
210 visual quality table
211 viewing condition parameters
212 layer formation and ordering decision unit
213 layered compressed codeblocks
214 TableL
215 bit-stream organizer
216 encoded digital image
217 master table generator
218 TableML
301 uniform scalar quantizer with a dead-zone
302 quantized coefficients
303 entropy encoder
304 table generation unit
801 compressed bit-stream
802 entropy decoder
803 reconstructed subband coefficients
804 codeblock partitioning unit
805 codeblocks
806 codeblock compression unit
807 compressed codeblocks
808 byte-count tables
809 quantizer step-sizes
810 visual quality table
811 viewing condition parameters
812 layer formation and ordering decision unit
813 layered compressed codeblocks
814 TableL
815 bit-stream organizer
816 encoded digital image
817 master table generator
818 TableML
819 bit-stream parser
820 compressed codeblock bit-streams
901 Q digital images
902 bit-budget
903 Encoder with visual progressive ordering of the bit-planes
904 visual quality table
905 compressed bit-streams
906 TableML
907 table generator
908 tables
909 truncation point initialization unit
910 truncation unit 911 truncated bit-streams
912 file size calculation unit
913 total file size
914 file size comparison unit
915 truncation point update unit

What is claimed is:

1. A method for producing a compressed digital image from an input digital image, wherein the compressed digital image is organized into layers corresponding to increasing visual quality levels, comprising the steps of:
   (a) decomposing the input digital image to produce a plurality of subbands, each subband having a plurality of subband coefficients;
   (b) quantizing the plurality of subband coefficients of each subband of the decomposed input digital image to produce a quantized output value for each subband coefficient of each subband;
   (c) forming at least one bit-plane from the quantized output values of the subband coefficients of each subband;
   (d) entropy encoding each bit-plane of each subband in at least one pass to produce a compressed bit-stream corresponding to each pass, wherein each subband is entropy encoded independently of the other subbands;
   (e) computing a threshold viewing distance for each pass;
   (f) providing a visual quality table that specifies a number of expected visual quality levels and corresponding threshold viewing distances;
   (g) for each expected visual quality level, identifying a minimal set of passes and their compressed bit-streams that are necessary to achieve the corresponding threshold viewing distance; and
   (h) ordering the compressed bit-streams corresponding to passes into layers from the lowest expected visual quality level to the highest expected visual quality level specified in the visual quality table to produce a compressed digital image, wherein each layer includes the passes and their corresponding compressed bit-streams from the identified minimal set corresponding to the expected visual quality level that have not been included in any lower visual quality layers.

2. The method according to claim 1 wherein the threshold viewing distance is computed using a model of the contrast sensitivity function for the human visual system.

3. A computer program product for causing a computer to perform the method of claim 1.

4. A method for producing a compressed digital image from an input digital image, wherein the compressed digital image is organized into layers corresponding to increasing visual quality levels, comprising the steps of:
   (a) decomposing the input digital image to produce a plurality of subbands, each subband having a plurality of subband coefficients;
   (b) quantizing the plurality of subband coefficients of each subband of the decomposed input digital image to produce a quantized output value for each subband coefficient of each subband;
   (c) partitioning each subband into a plurality of codeblocks;
   (d) forming at least one bit-plane from the quantized output values of the subband coefficients of each codeblock of each subband;
   (e) entropy encoding each bit-plane of each codeblock of each subband in at least one pass to produce a compressed bit-stream corresponding to each pass, wherein each codeblock is entropy encoded independently of the other codeblocks;
   (f) computing a threshold viewing distance for each pass;
   (g) providing a visual quality table that specifies a number of expected visual quality levels and corresponding threshold viewing distances;
   (h) for each expected visual quality level identifying a minimum set of passes and their corresponding compressed bit-streams that are necessary to achieve the corresponding threshold viewing distance; and
   (i) ordering the compressed bit-streams corresponding to passes into layers from the lowest expected visual quality level to the highest expected visual quality level specified in the visual quality table to produce a compressed digital image, wherein each layer includes the passes and their corresponding compressed bit-streams from the identified minimal set corresponding to the expected visual quality level that have not been included in any lower visual quality layers.

5. The method according to claim 3 wherein the threshold viewing distance is computed using a model of the contrast sensitivity function for the human visual system.

6. A computer program product for causing a computer to perform the method of claim 4.

7. A method of rate-control for at least one image, comprising the steps of:
   (a) providing a visual quality table for each image that specifies a number of expected visual quality levels and corresponding visual significance values;
   (b) compressing the plurality of images to produce compressed digital images, wherein each compressed digital image includes layers corresponding to the expected visual quality levels specified in the visual quality table;
   (c) producing a table of visual significance values and corresponding file sizes for possible truncation points of each compressed digital image, wherein for the expected visual quality levels of each compressed digital image, the truncation points represent the number of bytes necessary to achieve the corresponding expected visual quality levels;
   (d) initializing a current truncation point for each image;
   (e) truncating each compressed digital image to the corresponding current truncation point;
   (f) calculating a total compressed file size for the truncated compressed digital images;
   (g) comparing the total compressed file size for the truncated compressed digital images with a predetermined bit-budget;
   (h) updating the current truncation point to the next possible truncation point for the image having the lowest visual significance value at the next possible truncation point; and
   (i) repeating steps (e) through (h) until the total compressed file size is equal to or less than the bit-budget.

8. The method according to claim 7 wherein the visual significance value is a threshold viewing distance.

9. The method according to claim 8 wherein the threshold viewing distance is computed using a model of the contrast sensitivity function for the human visual system.

10. The method according to claim 7 wherein the visual significance value is a threshold display noise level.

11. The method according to claim 10 wherein the threshold display noise level is computed using a model of the contrast sensitivity function for the human visual system.

12. A computer program product for causing a computer to perform the method of claim 7.

13. A method for producing a compressed digital image from an input digital image, wherein the compressed digital image is organized into layers corresponding to increasing visual quality levels, comprising the steps of:
   (a) decomposing the input digital image to produce a plurality of subbands, each subband having a plurality of subband coefficients;
   (b) quantizing the plurality of subband coefficients of each subband of the decomposed input digital image to produce a quantized output value for each subband coefficient of each subband;
   (c) forming at least one bit-plane from the quantized output values of the subband coefficients of each subband;
   (d) entropy encoding each bit-plane of each subband in at least one pass to produce a compressed bit-stream corresponding to each pass, wherein each subband is entropy encoded independently of the other subbands;
   (e) computing a threshold display noise level for each pass;
   (f) providing a visual quality table that specifies a number of expected visual quality levels and corresponding threshold display noise levels;
   (g) for each expected visual quality level, identifying a minimal set of passes and their compressed bit-streams that are necessary to achieve the corresponding threshold display noise level; and
   (h) ordering the compressed bit-streams corresponding to passes into layers from the lowest expected visual quality level to the highest expected visual quality level specified in the visual quality table to produce a compressed digital image, wherein each layer includes the passes and their corresponding compressed bit-steams from the identified minimal set corresponding to the expected visual quality level that have not been included in any lower visual quality layers.

14. The method according to claim 13 wherein the threshold display noise level is computed using a model of the contrast sensitivity function for the human visual system.

15. A computer program product for causing a computer to perform the method of claim 13.

16. A method for producing a compressed digital image from an input digital image, wherein the compressed digital image is organized into layers corresponding to increasing visual quality levels, comprising the steps of:
   (a) decomposing the input digital image to produce a plurality of subbands, each subband having a plurality of subband coefficients;
   (b) quantizing the plurality of subband coefficients of each subband of the decomposed input digital image to produce a quantized output value for each subband coefficient of each subband;
   (c) partitioning each subband into a plurality of codeblocks;
   (d) forming at least one bit-plane from the quantized output values of the subband coefficients of each codeblock of each subband;
   (e) entropy encoding each bit-plane of each codeblock of each subband in at least one pass to produce a compressed bit-stream corresponding to each pass, wherein each codeblock is entropy encoded independently of the other codeblocks;
   (f) computing a threshold display noise level for each pass;
   (g) providing a visual quality table that specifies a number of expected visual quality levels and corresponding threshold display noise levels;
   (h) for each expected visual quality level, identifying a minimum set of passes and their corresponding compressed bit-steps that are necessary to achieve the corresponding threshold display noise level; and
   (i) ordering the compressed bit-streams corresponding to passes into layers from the lowest expected visual quality level to the highest expected visual quality level specified in the visual quality table to produce a compressed digital image, wherein each layer includes the passes and their corresponding compressed bit-streams from the identified minimal set corresponding to the expected visual quality level that have not been included in any lower visual quality layers.

17. The method according to claim 16 wherein the threshold display noise level is computed using a model of the contrast sensitivity function for the human visual system.

18. A computer program product for causing a computer to perform the method of claim 16.

* * * * *